United States Patent [19]

Liu

[11] Patent Number: 5,867,051
[45] Date of Patent: Feb. 2, 1999

[54] DIGITAL JOYSTICK INTERFACE CIRCUIT

[75] Inventor: William S. Y. Liu, Taipei, Taiwan

[73] Assignee: Cretech Co., Ltd., Taipei, Taiwan

[21] Appl. No.: 752,517

[22] Filed: Nov. 20, 1996

[51] Int. Cl.$^6$ ........................................................ H03L 5/00
[52] U.S. Cl. ........................... 327/333; 327/100; 327/142; 345/161; 463/38
[58] Field of Search ..................................... 327/142, 198, 327/333, 100; 463/38; 345/161

Primary Examiner—Timothy P. Callahan
Assistant Examiner—Kenneth B. Wells
Attorney, Agent, or Firm—Bacon & Thomas

[57] ABSTRACT

A digital joystick interface circuit includes a trigger detecting circuit, a flip-flop circuit and a value comparator. The trigger detecting circuit is provided for processing the changes of the voltage or electric currents of a game interface so as to reset the trigger signal of the interface. The flip-flop circuit controls the charge cycle of the game port and causes a counter to start counting during the time delay of the charge cycle. The value obtained by the counter after reading the joystick's coordinate signal or switch signal is compared with that of the comparator. When the two values are equivalent, the flip-flop circuit will reset, achieving coordinate addressing.

7 Claims, 6 Drawing Sheets

DIGITAL JOYSTICK INTERFACE CIRCUIT

BACKGROUND OF THE INVENTION (A) Field of the Invention

The present invention relates generally to a digital joystick interface circuit, and more particularly to a trigger detecting circuit for resetting the trigger signals of a game interface and, via a comparator, achieving a circuit for coordinate addressing.

(B) Description of the Prior Art

Generally, the coordinate addressing of game interfaces is controlled by joysticks. A conventional joystick is shown in FIG. 2. It includes a variable resistance 10 for connecting a middle point thereof to a game port of the game interface. By means of the time delay caused by the variable resistance 10, resistor R1, and capacitor C1, coordinate addressing is achieved. However, problems occur is that variable resistance 10 is subject to damage, and the capacitor C1 is easily affected by ambient temperatures and generates errors so that delay is not precise, and causing the coordinates to be displaced. In another conventional joystick, shown in FIG. 1, a plurality of analog switches 20 are connected to a series of resistors which replace variable resistance 10. Although switching of contacts may prevent damage to the resistances to a certain extent, there is the problem of error with the capacitor C1 working in conjunction with the resistances to constitute the time delay. This is because, while this arrangement would be more precise if the capacitor were in a vacuum, changes in temperature will cause the capacitor to generate errors easily. At the same time, in order to make smaller capacitors, it is necessary to provide a dielectric in the middle. Therefore, the precision of the delay will be affected more easily. Besides, in order to achieve higher precision, such analog switch joysticks are usually provided with more resistances, hence increasing the probability of error and cost, which is very unsatisfactory indeed.

SUMMARY OF THE INVENTION

Accordingly, a primary object of the present invention is to provide a digital joystick interface circuit in which the voltage or variation in electric currents of the game interface may be reduced to obtain the trigger signal of the interfaced, so that a flip-flop circuit may be used to control the charge cycle of the game port. During the time delay of the charge cycle, a counter is started so that a comparison between the counted value and that of the joystick coordinate signal or switch signal may be made. When the two values are equivalent, the flip-flop circuit will reset to achieve coordinate addressing, thus alleviating the drawbacks of conventional resistances joysticks.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
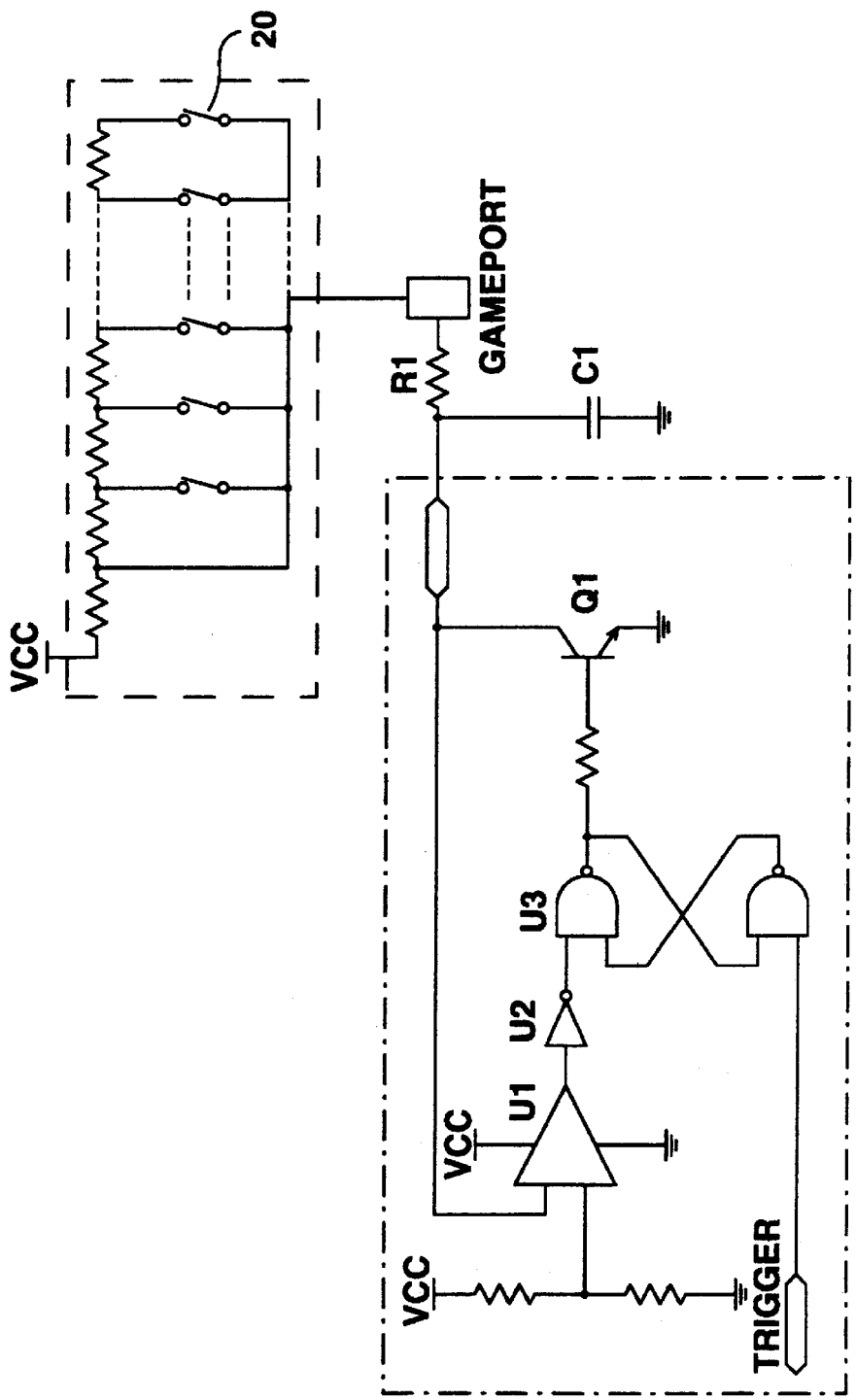
FIG. 1 shows a conventional variable resistance joystick circuit.
Figure 2:
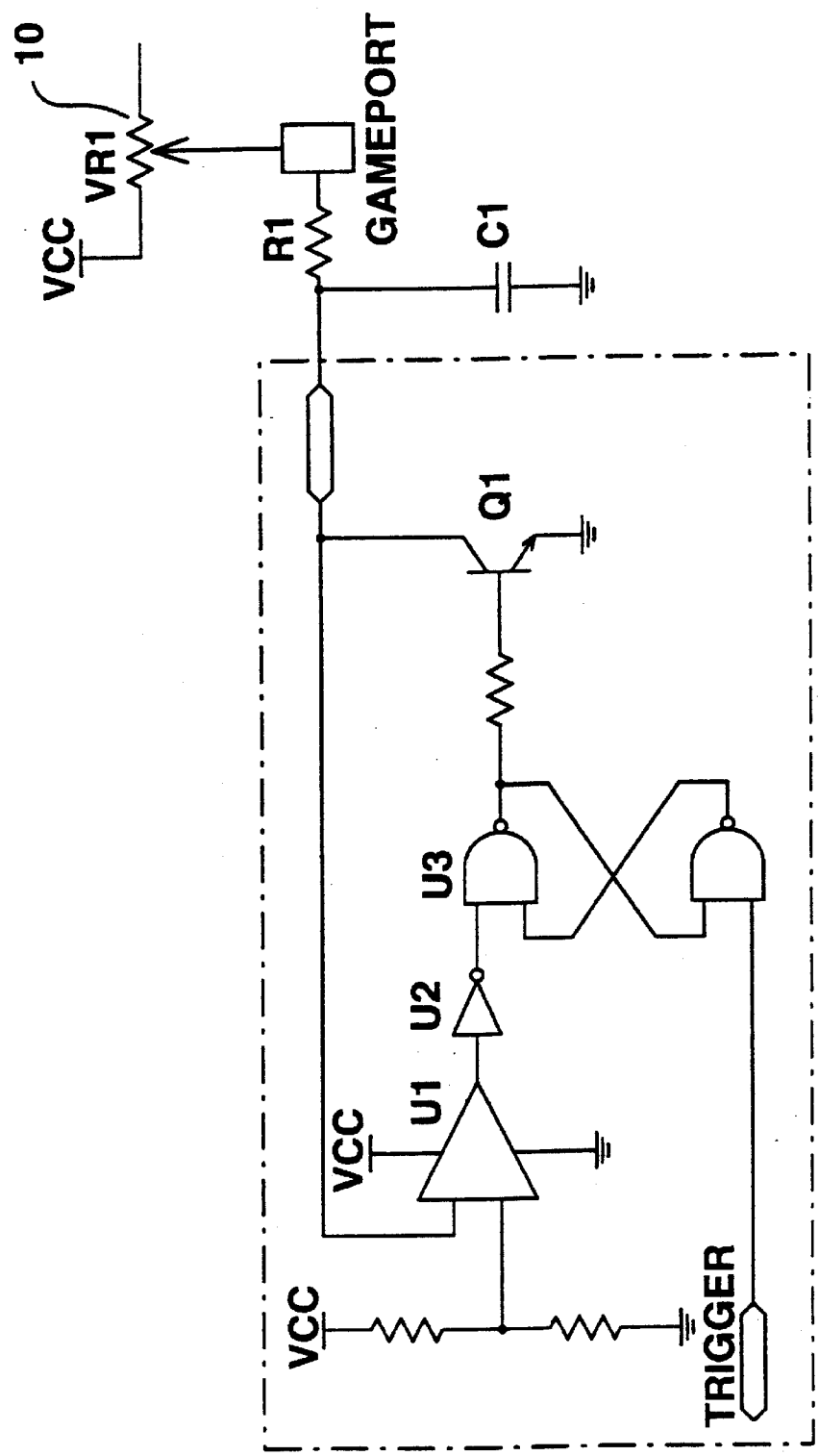
FIG. 2 shows a conventional analog resistance joystick circuit.
Figure 3:
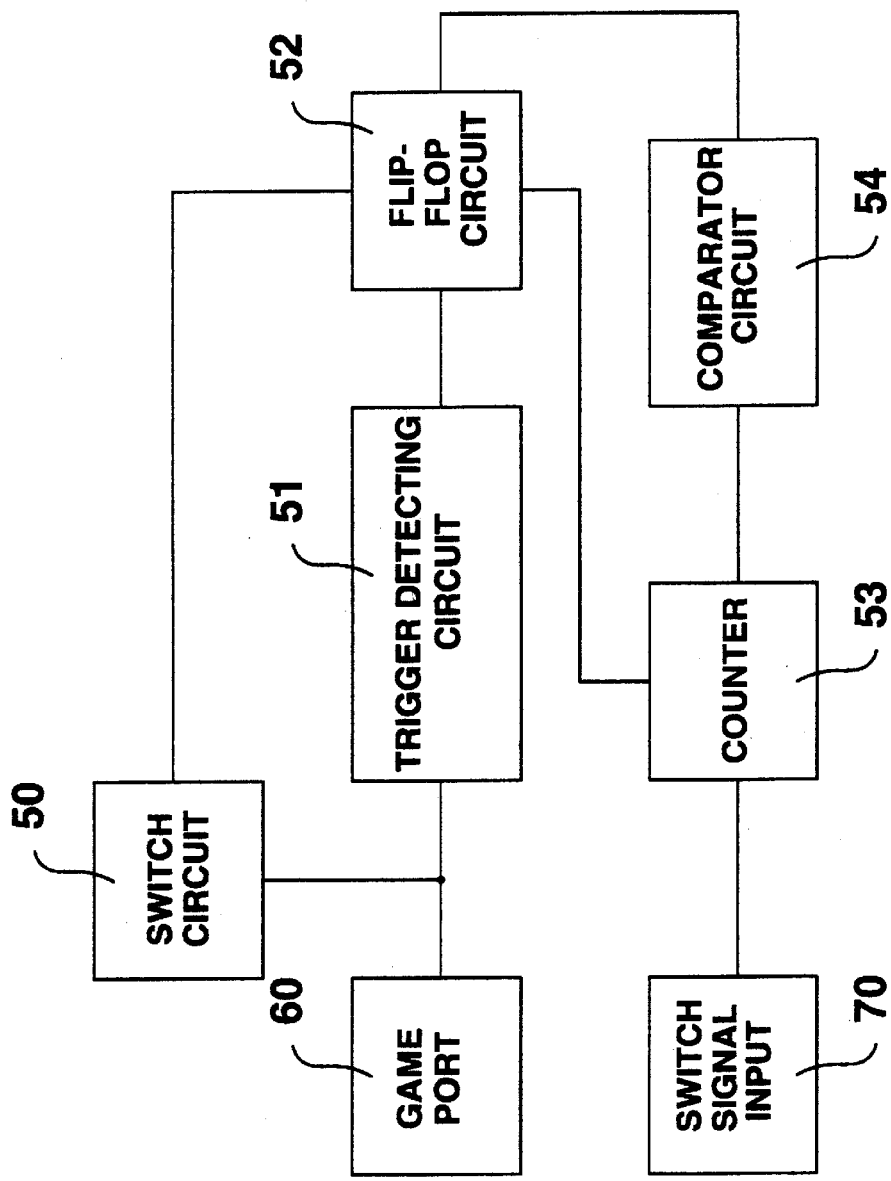
FIG. 3 is a block diagram of the circuit of the present invention.

With reference to FIG. 3, the present invention essentially comprises a switch circuit 50, a trigger detecting circuit 51, a flip-flop circuit 52, a counter 53 and a comparator circuit 54. The switch circuit 50 and the trigger detecting circuit 51 are connected to a game port 60 of the game interface for resetting the voltage or variations of electric currents of the interface so as to trigger the flip-flop circuit 52, so that the latter outputs a high voltage to cut off the switch circuit 50 to control the charge cycle of the game port. At the same time, during the time delay of the charge cycle, the counter 53 starts counting, and the value obtained is compared with the value of the joystick coordinates or a signal from a joystick trigger switch signal input 70 obtained by the comparator circuit 54. When the two values are equivalent, the flip-flop circuit 52 will reset, achieving precise coordinate addressing.

Figure 4:
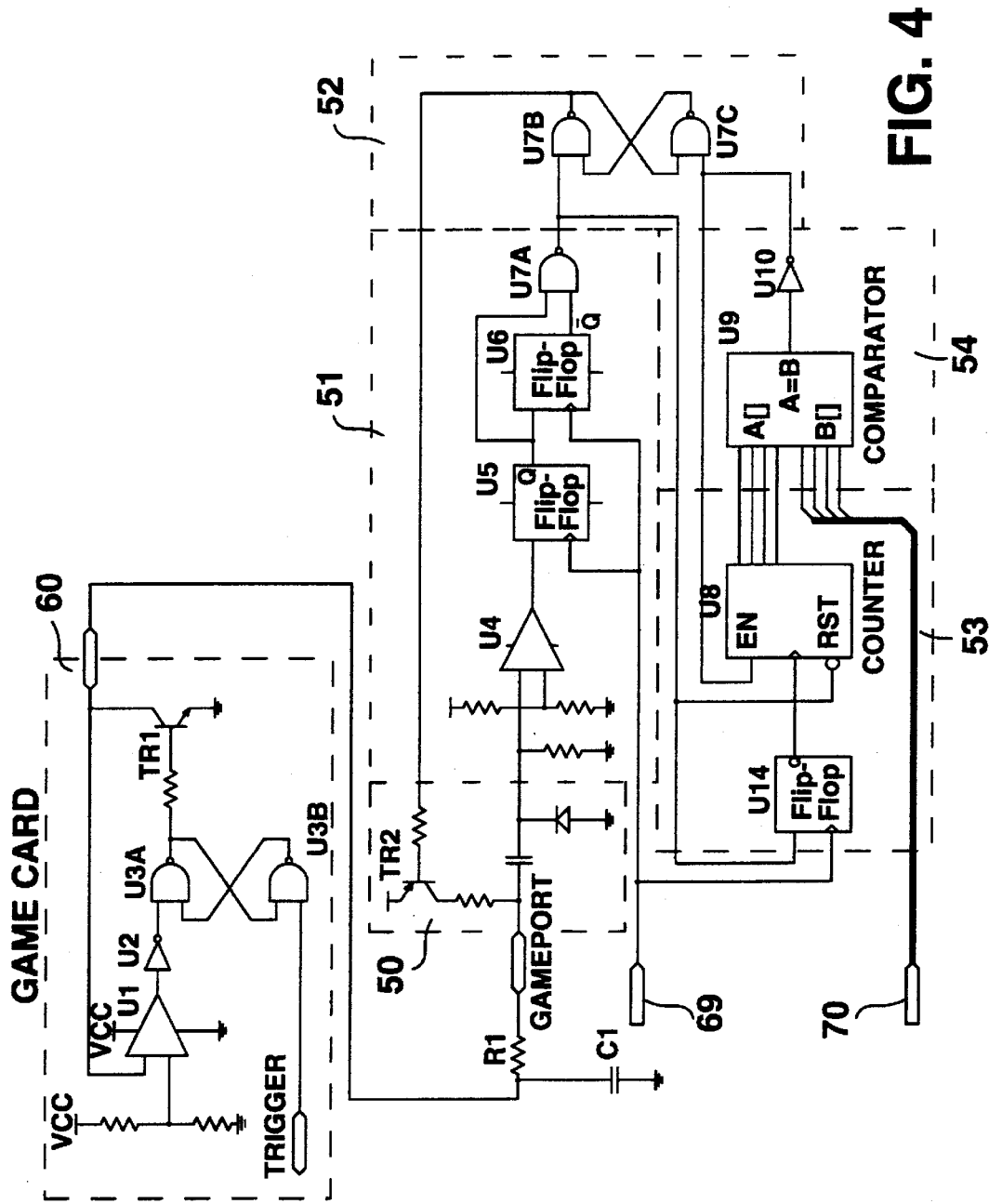
FIG. 4 is a preferred embodiment of the circuit of the present invention.

FIG. 4 shows a preferred embodiment of the circuit in which the game interface is a single chip integrated circuit (usually NE558). When the power is on, a trigger signal causes the flip-flop circuit comprised of NAND gates U3A and U3B to output a low voltage to cut off the transistor TR1 and charge the capacitor C1 connected to the collector of the transistor TR1. Capacitor C1 together with a resistor R1 constitute a time delay to form an output pulse. In this embodiment, when the pulse voltage is greater than a set reference value constituted by the divided voltage of resistors R4, R5 at the negative input end of the comparator U4, the voltage comparator U4 will then output a high voltage, thus triggering U5 and U6 so that the terminal Q of flip-flop U5 and the terminal Q of flip-flop U6 have a high voltage output. Clock signals for flip-flops U5 and U6 are input through clock signal input 69. In addition, since the two input terminals of NAND gate U7A are in a high state, the output of NAND gate U7A is a low voltage, achieving recovery of the trigger signal of the interface. This in turn triggers the flip-flop circuit composed of U7B and U7C so that the flip-flop circuit outputs a high voltage, thus closing the transistor TR2 connected to the output terminal. Subsequently, via op amp U1 and inverter U2 in the interface, the flip-flop circuit composed of NAND gates U3A and U3B may be reset to complete a trigger cycle.

The output terminal of NAND gate U7A in the trigger detecting circuit is also connected to the master reset (MR) terminal of the counter U8. Counter U8 is supplied with clock signals from clock signal input 69 via latch U14, one input of which is connected to the clock signal input and the other input of which is connected to the output of gate U7A. When the output of gate U7A is high, the counter U8 stops. When gate U7A switches to a low state, the counter U8 starts counting and outputs the value to terminals A0–A3 of the comparator U9. Terminals B0–B3 of the comparator U9 are connected to the coordinate signal or switch signal of the joystick to read the value of the coordinates or the switch signal. The read value is compared with that obtained by the counter U8 in the comparator U9. When the two values are equivalent, i.e., when A=B, a high voltage will be output. Via the conversion of U10, the flip-flop circuit composed of gates U7B and U7C may be reset. In this way, the signal of the joystick's displacement may be calculated to obtain the coordinate address.

Figure 5A:
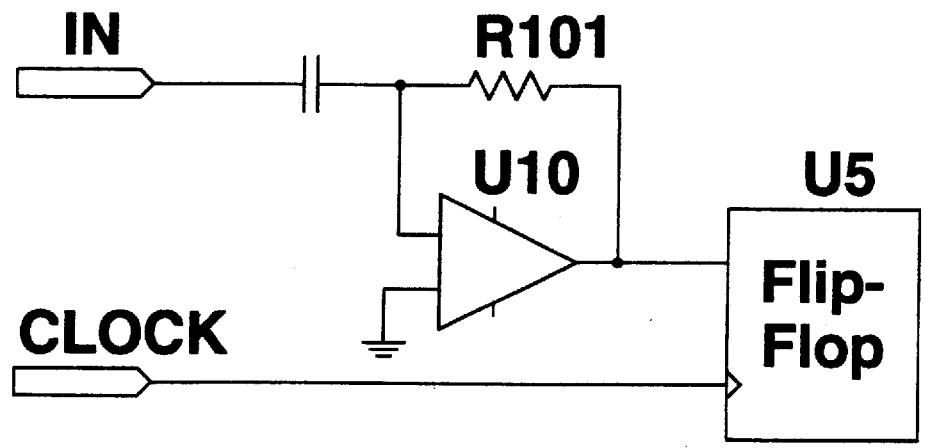
FIG. 5A shows an embodiment of the trigger detecting circuit of the present invention.
Figure 5C:
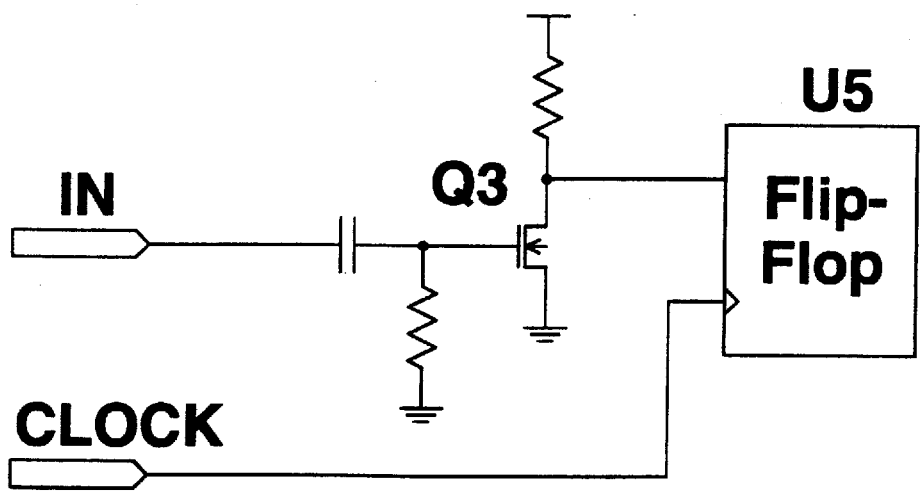
FIG. 5C shows still another embodiment of the trigger detecting circuit of the invention.
Figure 5B:
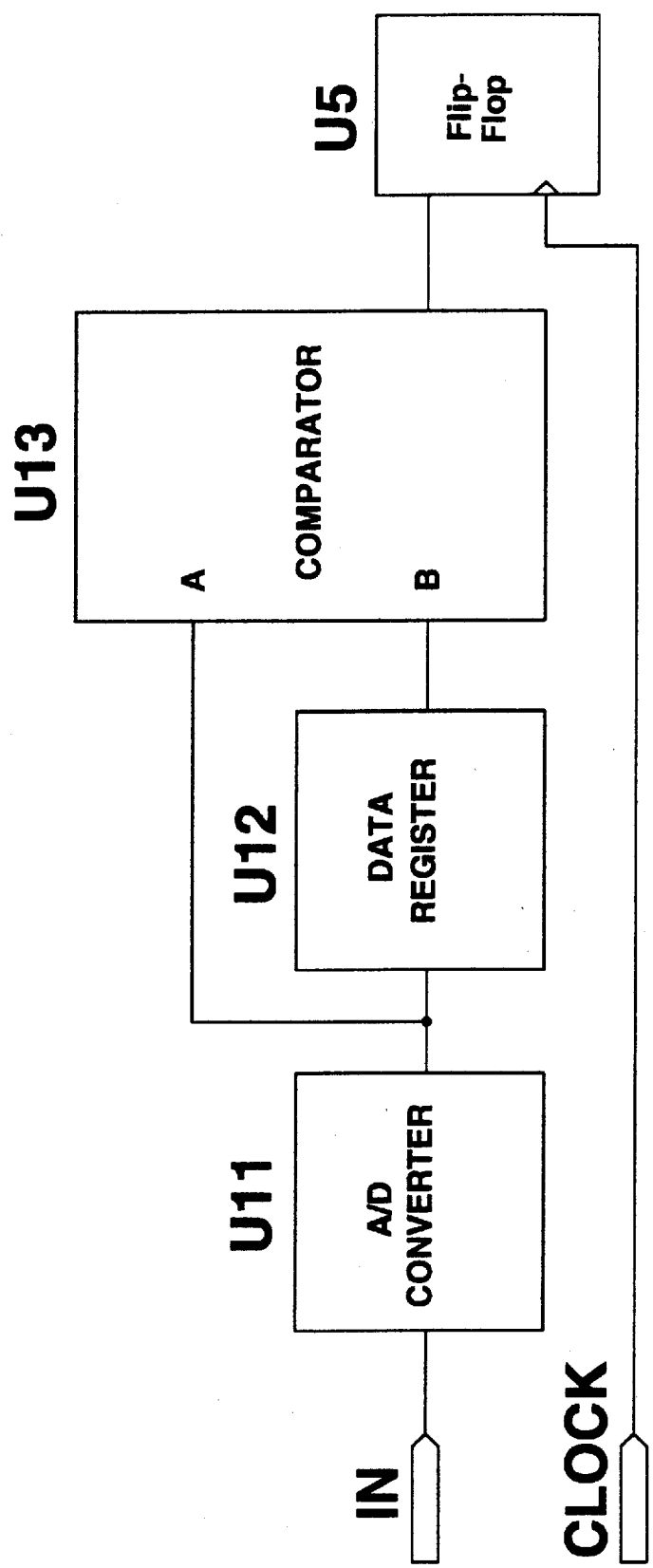
FIG. 5B shows another embodiment of the trigger detecting circuit of the present invention.

FIGS. 5A, 5B, and 5C show various alternative trigger inputs to flip-flop U5. The input to these circuits, labelled "IN", is still via the game port and the switch circuit 50. With reference to FIG. 5A, the trigger detecting circuit of the invention may be provided with a differentiation circuit composed of comparator U10 and resistor R101. After the trigger voltage is differentiated, it is output to flip-flop U5. Or as shown in FIG. 5B, an analog/digital converter U11 is provided to convert the voltage into a digital signal which is stored in a data register U12. When another pulse arrives, the comparator U13 may make the comparison between A and B. Then, when A=1 and B=0, flip-flop U5 will be triggered. As shown in FIG. 5C, the invention may be provided with a MOS FET to convert the voltage signal into a square wave to trigger flip-flop U5.

In summary, the present invention employs the trigger detecting circuit and counter to achieve precise detection of the coordinate signal and switch signal of the joystick for precise coordinate addressing.

Although the present invention has been illustrated and described with reference to the preferred embodiment thereof, it should be understood that it is in no way limited to the details of such embodiment but is capable of numerous modifications within the scope of the appended claims.

What is claimed is:

1. A digital joystick interface circuit, comprising;
    a trigger detecting circuit for detecting trigger signals present in said interface by converting voltage changes of the trigger signals into pulses;
    a flip-flop circuit for detecting edges of said pulses and controlling a charge cycle of a game port to set a time delay; and
    a value comparator circuit for reading a digital coordinate signal or switch signal and comparing the digital coordinate signal or switch signal with a value obtained by a counter during the time delay set by the flip-flop circuit, said flip-flop circuit being reset when the value obtained by the counter equals the digital coordinate signal or switch signal.

2. A digital joystick interface circuit as claimed in claim 1, wherein said trigger detecting circuit further comprises a switch circuit for controlling starting and ending of the charge cycle.

3. A digital joystick interface circuit as claimed in claim 1, wherein said trigger detecting circuit comprises a voltage comparator.

4. A digital joystick interface circuit as claimed in claim 1, wherein said trigger detecting circuit comprises an analog/digital converting circuit.

5. A digital joystick interface circuit as claimed in claim 1, wherein said trigger detecting circuit comprises a differentiation circuit.

6. A digital joystick interface circuit as claimed in claim 1, wherein said trigger detecting circuit comprises a transistor.

7. A digital joystick interface circuit as claimed in claim 4, wherein said analog/digital converting circuit comprises a data register and a comparator.

* * * * *